United States Patent
Rombakh et al.

(10) Patent No.: US 10,587,713 B2
(45) Date of Patent: Mar. 10, 2020

(54) PROXY FOR SHARING REMOTE DESKTOP SESSIONS

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 115 days.

(21) Appl. No.: 15/431,917

(22) Filed: Feb. 14, 2017

(65) Prior Publication Data

US 2018/0234515 A1 Aug. 16, 2018

(51) Int. Cl.
| | |
|---|---|
| *H04L 29/08* | (2006.01) |
| *G06F 3/14* | (2006.01) |
| *H04L 29/06* | (2006.01) |
| *G06F 15/16* | (2006.01) |

(52) U.S. Cl.
CPC .......... *H04L 67/28* (2013.01); *G06F 3/1454* (2013.01); *H04L 29/08* (2013.01); *H04L 67/146* (2013.01); *H04L 67/42* (2013.01); *G06F 15/16* (2013.01)

(58) Field of Classification Search
None
See application file for complete search history.

(56) References Cited

U.S. PATENT DOCUMENTS

| | | | | |
|---|---|---|---|---|
| 8,966,112 | B1* | 2/2015 | Franke | H04L 69/321 370/229 |
| 2008/0005236 | A1* | 1/2008 | Schmieder | H04L 65/4084 709/204 |
| 2009/0031035 | A1* | 1/2009 | Dharmaraju | H04W 8/005 709/230 |
| 2009/0070404 | A1* | 3/2009 | Mazzaferri | G06F 9/542 709/202 |
| 2011/0119331 | A1* | 5/2011 | Zhang | H04L 29/12405 709/203 |
| 2012/0011198 | A1* | 1/2012 | Mazzaferri | G06F 9/542 709/203 |
| 2012/0246215 | A1* | 9/2012 | Gopshtein | G06F 9/54 709/202 |
| 2013/0136125 | A1* | 5/2013 | Jain | H04L 47/38 370/392 |
| 2014/0006979 | A1* | 1/2014 | Venkatesh | G06F 3/048 715/760 |

(Continued)

*Primary Examiner* — James A Edwards
(74) *Attorney, Agent, or Firm* — Kirton McConkie; Brian Tucker (57) ABSTRACT

A remote desktop can be shared with a number of clients. A proxy client can be employed to establish a remote desktop connection with a server for the purpose of accessing a remote desktop. The proxy client can receive desktop display data pertaining to the remote desktop and forward it to a remote desktop client on one or more clients to cause the remote desktop to be displayed on each of the clients. When users interact with the remote desktop displayed on the clients, the remote desktop client can send desktop input data to the proxy client. The proxy client can then forward this desktop input data to the server over the remote desktop connection. The proxy client may selectively block desktop input data received from a client that is not currently authorized to provide input to the remote desktop.

20 Claims, 8 Drawing Sheets

(56) References Cited

U.S. PATENT DOCUMENTS

| | | | |
|---|---|---|---|
| 2014/0040360 A1* | 2/2014 | Privat | G06F 3/1423 709/204 |
| 2014/0304322 A1* | 10/2014 | Dey | H04L 67/141 709/203 |
| 2014/0330891 A1* | 11/2014 | Basha P.R. | H04L 63/0428 709/203 |
| 2014/0372510 A1* | 12/2014 | Fausak | H04L 67/40 709/203 |
| 2015/0003313 A1* | 1/2015 | Shao | H04L 67/10 370/312 |
| 2016/0099948 A1* | 4/2016 | Ott | G06F 9/54 |

* cited by examiner

PROXY FOR SHARING REMOTE DESKTOP SESSIONS

CROSS-REFERENCE TO RELATED APPLICATIONS

N/A

BACKGROUND

The present invention is generally directed to remote desktop environments. More particularly, the present invention can allow a remote desktop to be shared among a number of clients.

A remote desktop is a desktop that is executed on a remote server but made accessible locally via a remote display protocol. A number of remote display protocols are available for accessing a remote desktop including Microsoft's Remote Desktop Protocol (RDP), Citrix's Independent Computing Architecture (ICA), VMware's PCoIP, etc. These remote display protocols define techniques for transferring a desktop's display data to the client where it is displayed and for transferring input received at the client back to the desktop on the server. As a result, the remote desktop will appear as if it were a local desktop.

A similar technique can be employed to provide a remote application (or published application). Unlike in a remote desktop scenario in which the entire desktop will be transferred for display on the client, in a remote application scenario, only the user interface of the application is transferred for display. Because a remote display protocol will be used in a similar manner in either the remote desktop or remote application scenario, for purposes of the present disclosure as well as the claims, a remote desktop should be construed as encompassing both remote desktops and remote applications.

In typical scenarios, a user will employ a remote desktop client on a local computing device to establish a remote display protocol connection for accessing a remote desktop. The establishment of the remote display protocol connection will typically require the user to provide credentials that will be employed to log the user into the desktop. Therefore, there is a one-to-one relationship between the user and the remote desktop. If the user desired to share the remote desktop, it would be necessary to employ a separate application such as VNC. In such cases, the local computing device would have to decode the remote display protocol communications to display the remote desktop on the local computing device and then encode the display data (e.g., using VNC) for transmission to another computing device. This would result in significant processing on the local computing device.

BRIEF SUMMARY

The present invention extends to methods, systems, and computer program products for sharing a remote desktop with a number of clients. A proxy client can be employed to establish a remote desktop connection with a server for the purpose of accessing a remote desktop. The proxy client can receive desktop display data pertaining to the remote desktop and forward it to a remote desktop client on one or more clients to cause the remote desktop to be displayed on each of the clients. When users interact with the remote desktop displayed on the clients, the remote desktop client can send desktop input data to the proxy client. The proxy client can then forward this desktop input data to the server over the remote desktop connection. The proxy client may selectively block desktop input data received from a client that is not currently authorized to provide input to the remote desktop.

In one embodiment, the present invention is implemented by a proxy client executing on a proxy as a method for sharing a remote desktop. The proxy client can establish a remote desktop connection to access a remote desktop on a server. The proxy client can receive desktop display data pertaining to the remote desktop from the server and then forward the desktop display data to a remote desktop client on one or more clients.

In another embodiment, the present invention is implemented as computer storage media storing computer executable instructions which when executed on a proxy implement a proxy client that is configured to share a remote desktop. The proxy client can receive, via a remote desktop connection established with a server, desktop display data pertaining to a remote desktop executing on the server. The proxy client can then send the desktop display data to a remote desktop client executing on one or more clients to allow the remote desktop to be displayed on the one or more clients. The proxy client can also receive, from at least one of the one or more clients, desktop input data defining user input that was received at the remote desktop displayed on the corresponding client. The proxy client can forward the desktop input data over the remote desktop connection.

In another embodiment, the present invention can be implemented as computer storage media storing computer executable instructions which when executed implement a proxy client that is configured to receive desktop display data pertaining to a remote desktop and to forward the desktop display data to a remote desktop client, and the remote desktop client that is configured to receive and process the desktop display data to cause the remote desktop to be displayed and to generate and send desktop input data to the proxy client in response to a user providing input to the remote desktop. The proxy client is further configured to receive the desktop input data from the remote desktop client and forward the desktop input data to the remote desktop.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
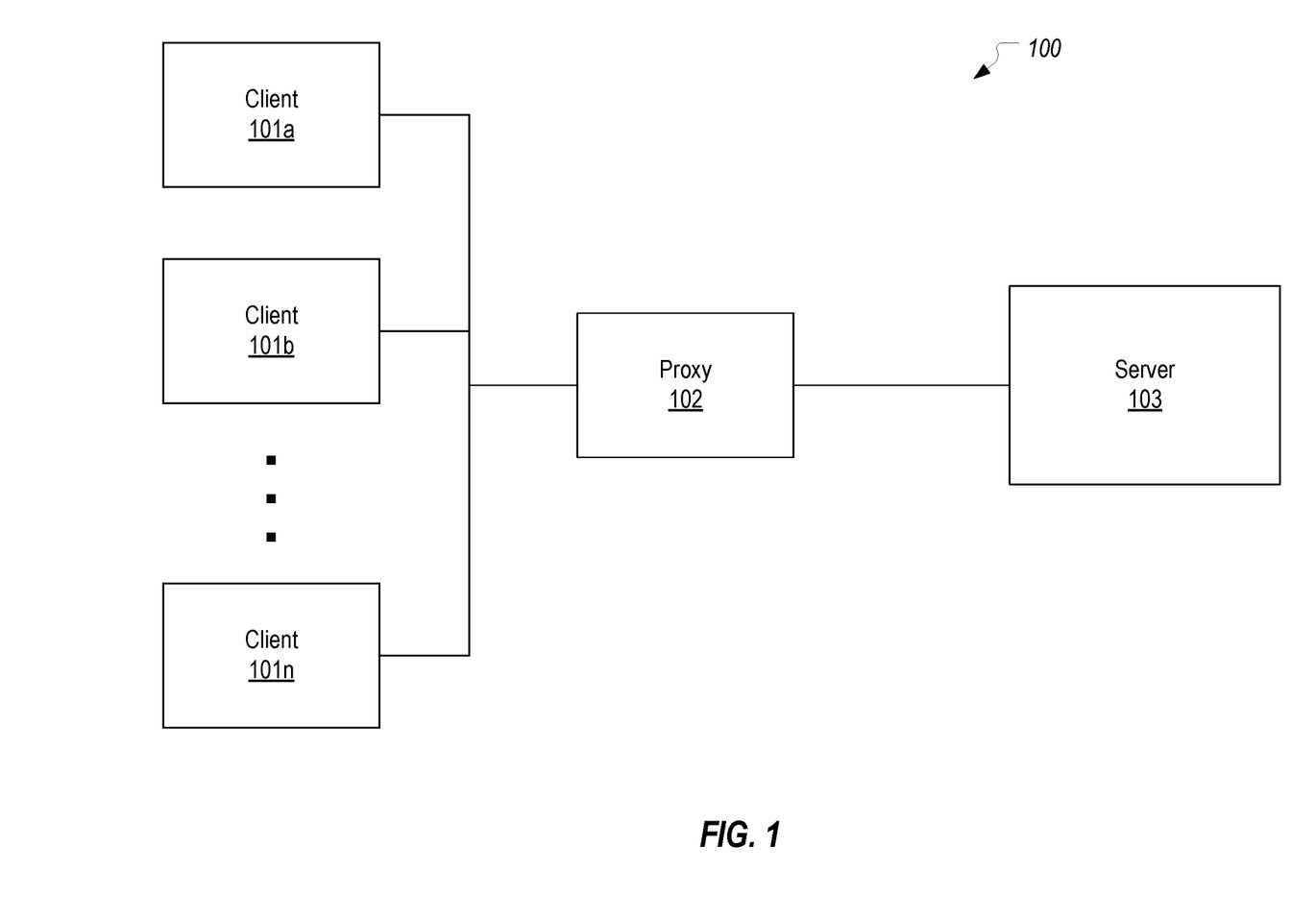
FIG. 1 illustrates an example computing environment in which the present invention can be implemented.

FIG. 1 illustrates an example computing environment 100 in which the present invention can be implemented. Computing environment 100 includes a number of clients 101a-101n (where n can represent any integer), a proxy 102, and a server 103. Clients 101a-101n can be any type of computing device that is capable of implementing a remote display protocol for the purpose of accessing a remote desktop. Therefore, clients 101a-101n can include thin clients, mobile devices, laptops, desktops, etc. Proxy 102 may also be any type of computing device that is capable of implementing a remote display protocol. In some cases, clients 101a-101n and proxy 102 may be the same type of computing devices (e.g., thin clients). Server 103 can represent any type of computing device that is capable of executing a desktop and implementing a remote display protocol to enable the desktop to be accessed remotely.

As shown in FIG. 1, clients 101a-101b and proxy 102 may typically be connected to the same LAN. By way of example only, clients 101a-101n can be computing devices employed by students and proxy 102 can be a computing device employed by a teacher in a classroom environment. However, as will become apparent below, clients 101a-101n could be connected to proxy 102 via any network connection including via the internet. Proxy 102 can also be connected to serer 103 via any network connection.

Figure 2:
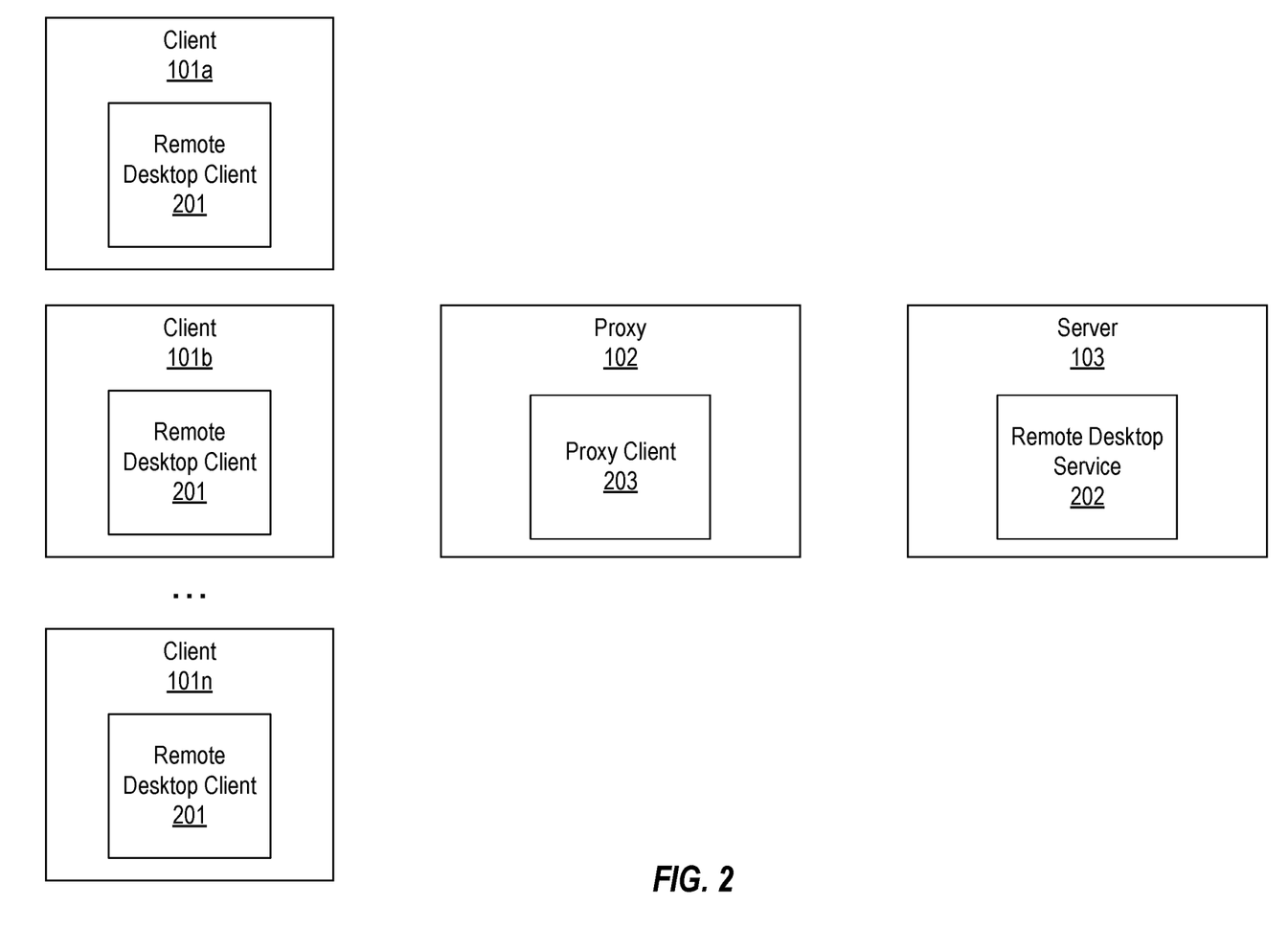
FIG. 2 illustrates various components that can be employed on clients, a proxy, and a server to implement embodiments of the present invention.

FIG. 2 illustrates components that can be employed on clients 101a-101n, proxy 102, and server 103 to enable the present invention to be implemented in computing environment 100. Server 103 includes a remote desktop service 202 which can represent the server-side components that are employed to provide access to a remote desktop. For example, remote desktop service 202 may represent Microsoft's Remote Desktop Services role in Windows Server, the Citrix XenApp or XenDesktop solutions, the VMware Horizon solution, or any of the many other remote desktop server-side solutions. Accordingly, remote desktop service 202 can be configured to provide access to a desktop (or application) that executes on server 103. Importantly, remote desktop service 202 implements a remote display protocol to allow this access.

Clients 101a-101n can each include a remote desktop client 201 which can represent a client-side component that is configured to implement a remote display protocol for the purpose of receiving, from a remote desktop service, display data pertaining to a remote desktop and for transmitting, to the remote desktop service, user input directed to the remote desktop. In some embodiments, remote desktop client 201 could represent any of the many currently available remote desktop clients such as Microsoft's Remote Desktop Connection, the Citrix Receiver, or the VMware Horizon client. However, as will be explained in detail below, in some embodiments, remote desktop client 201 can represent a remote desktop client that is customized for use with the present invention.

Proxy 102 includes a proxy client 203 that is configured to function as a remote desktop client for the purpose of accessing a remote desktop via remote desktop service 202. Accordingly, proxy client 203 can implement a remote display protocol to receive desktop display data from and to provide desktop input data to remote desktop service 202 to thereby allow a user of proxy 102 to access a remote desktop executing on server 103. Additionally, proxy client 203 can be configured to route desktop display data received from remote desktop service 202 to remote desktop client 201 on one or more of clients 101a-101n. For example, proxy client 203 can be configured to multicast or broadcast the desktop display data over a LAN to which proxy 102 and clients 101a-101n are connected. In addition to routing desktop display data to one or more of clients 101a-101n, proxy client 203 can also be configured to receive desktop input data from remote desktop client 201 on any of clients 101a-101n that have received and displayed the desktop display data. As a result, proxy client 203 will appear as a remote desktop service to remote desktop client 201.

Whenever proxy client 203 receives desktop input data from remote desktop client 201 on any of clients 101a-101n, proxy client 203 can route the desktop input data to remote desktop service 202. Therefore, from the perspective of remote desktop service 202, it will appear as if this desktop data originated at proxy 102. Additionally, proxy client 203 can be configured to receive input directly from a user of proxy 102 and to route corresponding desktop data to remote desktop service 202. In this way, the remote desktop executing on server 103 can be displayed on proxy 102 and on one or more of clients 101a-101n. A user of proxy 102 and any users of the one or more clients on which the remote desktop is displayed will also be able to provide input to the remote desktop.

Figure 3A:
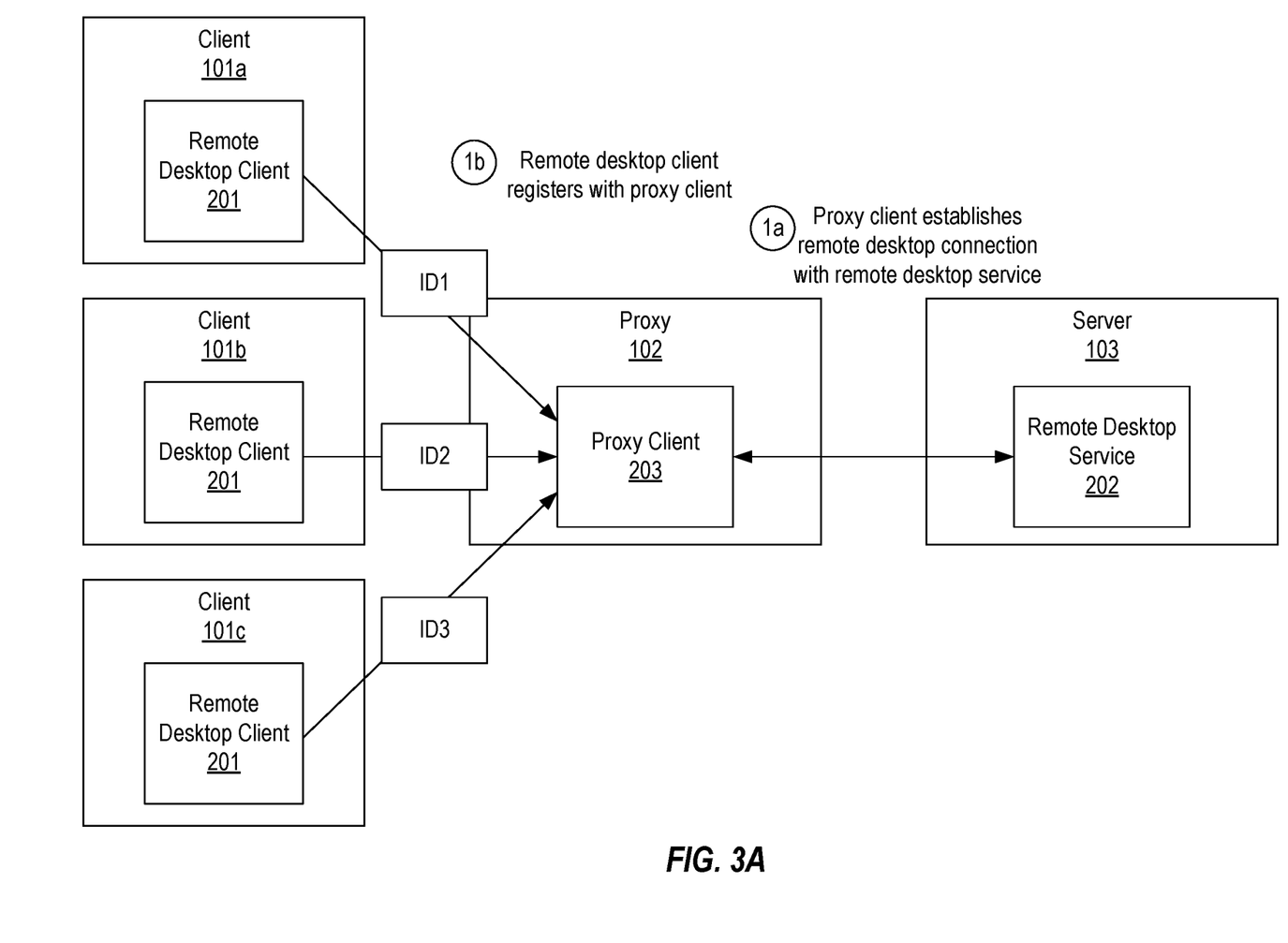
FIGS. 3A-3C illustrate an example of how a remote desktop can be shared with multiple clients.
Figure 3B:
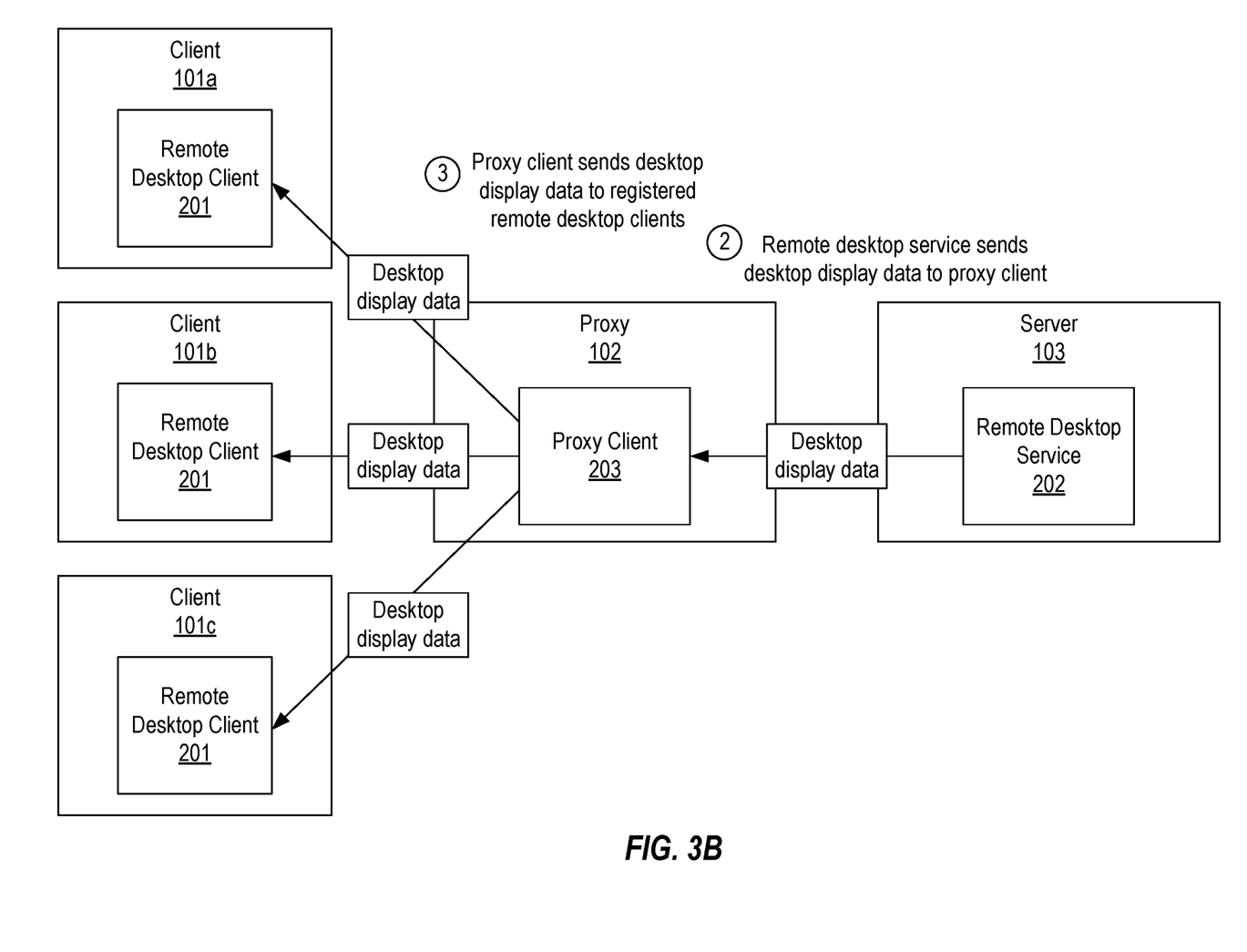
Figure 3C:
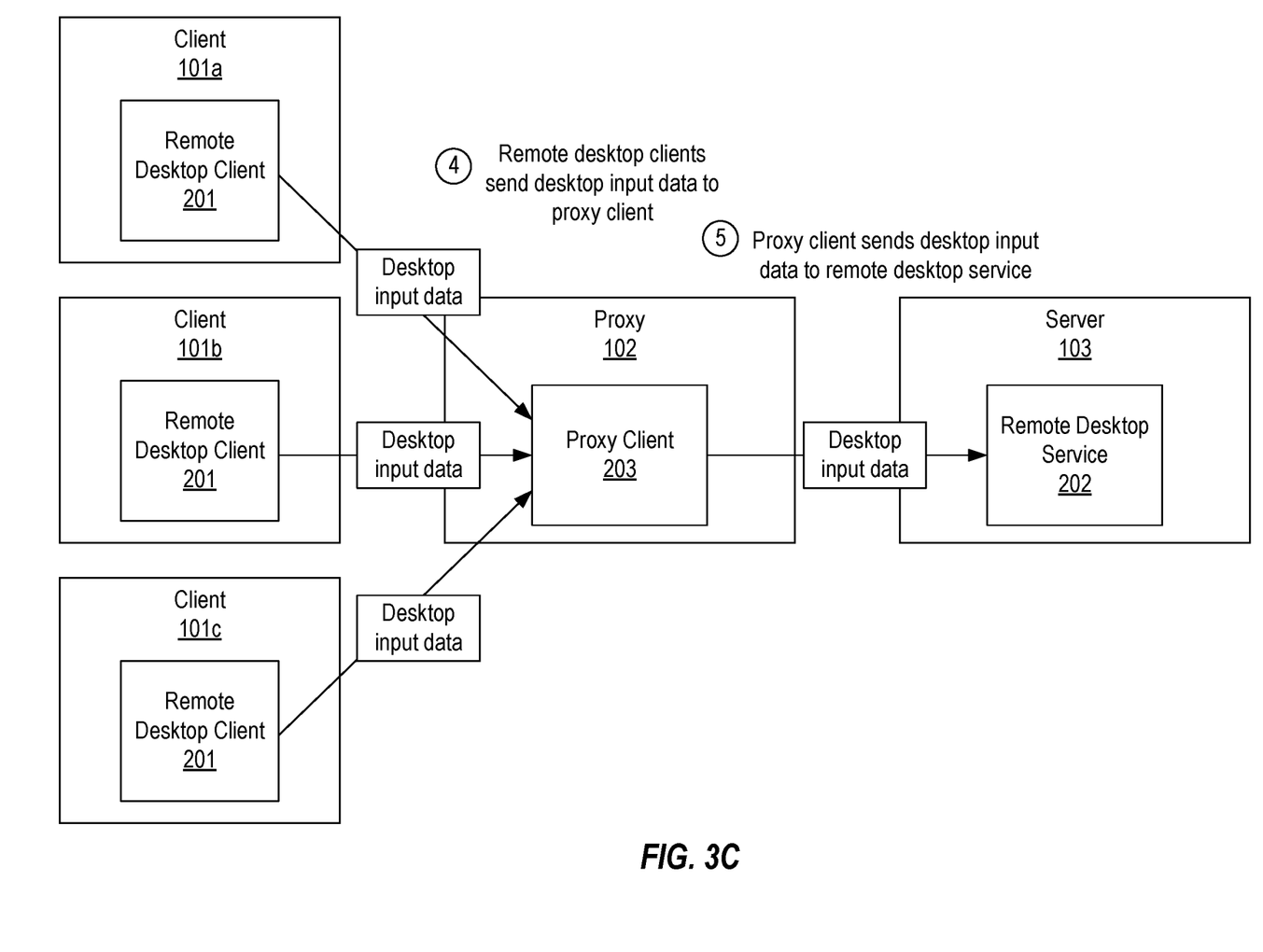

FIGS. 3A-3C provide an example of how proxy client 203 can enable this sharing of a remote desktop among a number of clients 101a-101n. For purposes of this example, it will be assumed that proxy 203 shares a remote desktop with three clients 101a-101c although a remote desktop could be shared with any number of clients using the techniques of the present invention.

FIG. 3A illustrates that, in step 1a, proxy client 203 establishes a remote desktop connection with remote desktop service 202. This remote desktop connection can be established using any suitable remote display protocol and will result in a desktop being launched (if not already executing) on server 103. In conjunction with step 1a, remote desktop client 201 on clients 101a-101c can register with proxy client 203 to share a remote desktop in step 1b. Each remote desktop client 201 can implement step 1b at a different time including both before, during, or after proxy client 203 establishes the remote desktop connection with remote desktop service 202.

As represented in FIG. 3A, this registration can involve providing some type of identifier (or ID) to proxy client 203 that proxy client 203 can employ to distinguish each registered client. Notably, unlike typical remote desktop techniques, step 1b does not involve providing credentials for the purpose of logging in to a desktop. Instead, since remote desktop clients 201 will be sharing a remote desktop established by proxy client 203 rather than launching their own desktop, the identifier can be provided to proxy client 203 to facilitate this sharing as will be further described below.

This identifier can be in any suitable form or format. For example, a unique identifier specific for use in remote desktop sharing scenarios could be assigned to each instance of remote desktop client 201. Alternatively, the IP address (or other network identifier) of each client could be used as the identifier. A combination of such identifiers could also be used. In any case, proxy client 203 can receive/identify an identifier of each registered remote desktop client 201 to allow proxy client 203 to identify which remote desktop client 201 has sent a received communication pertaining to a shared remote desktop.

Turning now to FIG. 3B, once proxy client 203 has established a remote desktop connection with remote desktop service 202 (and once the desktop has been launched on server 103), remote desktop service 202 will commence sending desktop display data to proxy client 203 in step 2. The term "desktop display data" should be construed as remote display protocol communications that include content (e.g., graphics commands) that proxy client 203 can employ to display the desktop on proxy 102. As mentioned above, a remote desktop should be construed as including a remote application and therefore desktop display data may represent the user interface of a single application in some embodiments. Because remote desktop service 202 can represent any of the many available server-side remote desktop solutions, this desktop display data can be transmitted to proxy client 203 in a typical manner. As is known, remote desktop service 202 can repeatedly send desktop display data as the remote desktop's display changes.

Although not shown, proxy client 203 will typically process the desktop display data to render the remote desktop on proxy 102. In this way, a user can employ proxy 102 to view the remote desktop. However, it is also possible that, in some embodiments, proxy client 203 will not cause the remote desktop to be displayed on proxy 102. Such may be the case when proxy 102 is not a user computing device. For example, it is possible that remote desktop client 201 can be configured to operate in a "host mode" in which a host of the remote session can employ one of clients 101a-101c to establish the remote desktop on server 103 via proxy 102. In such cases, proxy client 203 can perform substantially the same steps as described above to establish the remote desktop connection with remote desktop service 202 except that the user communications for launching the remote desktop (e.g., the input of the user's credentials) would originate at one of clients 101a-101c and be forwarded by proxy client 203.

Whether or not proxy client 203 processes the desktop display data to render the remote desktop on proxy 102, proxy client 203 can forward the desktop display data onto the registered remote desktop clients 201 in step 3 which in this case are assumed to be those executing on client 101a-101c. Proxy client 203 can employ various techniques to forward the desktop display data. For example, in the context of RDP, the desktop display data will be in the form of a PDU. In such cases, whenever proxy client 203 receives a PDU pertaining to the display of the remote desktop, it can forward the PDU onto each registered remote desktop client 201 by sending the PDU to a multicast IP address or by sending the PDU directly to the IP address of each registered client. In any case, remote desktop client 201 can be configured to listen for such PDUs (whether at a multicast IP address or at the client-specific IP address) and to process the desktop display data contained in such PDUs in a typical manner to thereby cause the remote desktop to be displayed on the client. From the perspective of remote desktop client 201, it will appear that proxy client 203 is the source of the remote desktop (i.e., that the desktop is executing on proxy 102). In this regard, proxy client 203 functions somewhat like remote desktop service 202 (at least for the purpose of using a remote display protocol to send desktop display data to remote desktop clients 201).

At this point, the remote desktop will be displayed on clients 101a-101c (and likely on proxy 102). Importantly, the exact same remote desktop will be displayed on each of these devices. In other words, the same desktop display data that was communicated by remote desktop service 202 to proxy client 203 will be used to generate the remote desktop on each of clients 101a-101c. In this way, the remote desktop that is established by proxy client 203 will be shared with clients 101a-101c. For example, an instructor can establish a remote desktop on proxy 102 and then allow his or her students to view the same remote desktop on clients 101a-101c.

In addition to allowing the remote desktop to be viewed on clients 101a-101c, proxy client 203 can also allow any of the users of clients 101a-101c as well as the user of proxy 102 to provide input to the remote desktop. FIG. 3C illustrates how this can be accomplished. As mentioned above, remote desktop client 201 and proxy client 203 can be configured to not only display a remote desktop but to also capture user input to the remote desktop and generate remote display protocol communications representing the input (hereinafter "desktop input data"). In the case that the input is provided directly on proxy 102, proxy client 203 can send the desktop input data to remote desktop service 202 in a typical fashion. However, in the case that the input is provided on any of clients 101a-101c, proxy client 203 can be configured to receive the corresponding desktop input data and redirect it to remote desktop service 202.

For example, in step 4 shown in FIG. 3C, each of clients 101a-101c is shown as sending desktop input data (which, in an RDP example, may be in the form of keyboard and mouse input PDUs) to proxy client 203. Again, from the perspective of remote desktop clients 201, the remote desktop will appear to be executing on proxy 102 (i.e., remote desktop client 201 will implement a remote desktop connection with proxy client 203 as if it were a remote desktop service). Similar to how proxy client 203 sends desktop display data to remote desktop client 201, remote desktop client 201 may also send desktop input data to proxy client 203 using a multicast or directed channel. In the case of multicasting the desktop input data, it would be desirable to include the identifier of the remote desktop client 201 that sends the desktop input data (e.g., by including the identifier in a header of the desktop input data). This will allow proxy client 203 to identify the source of the desktop input data as well as allow other remote desktop clients 201 to identify communications that should be ignored (i.e., to prevent crosstalk between remote desktop clients 201). In contrast, in the case of a directed channel, proxy client 203 may be able to identify the source of the desktop input data by virtue of how the desktop input data is received (e.g., the port by which it is received).

In response to receiving the desktop input data from any of clients 101a-101c, proxy client 203 can forward the desktop input data to remote desktop service 202 in step 5. This communication of the desktop input data to remote desktop service 202 can be performed in a typical manner (i.e., as if the desktop input data represented user input that was received directly at proxy 102 rather than at clients 101a-101c).

Regardless of the actual source of the user input, remote desktop service 202 will receive the desktop input data and process it to cause the remote desktop to be updated accordingly. For example, if the desktop input data represents a mouse click that was performed on client 101a, the mouse click will be performed in the remote desktop executing on server 103. Likewise, if the desktop input data represents keyboard input that was provided on client 101c, the keyboard input will be performed in the remote desktop executing on server 103.

As a result of the desktop input data, the display of the remote desktop will likely be updated. As a result, remote desktop service 202 will send new desktop display data to proxy client 203 which will in turn forward the desktop display data onto each registered client. This process can continue indefinitely as long as proxy client 203 maintains the remote desktop connection with remote desktop service 202.

FIG. 3C does not distinguish the timing of receiving the desktop input data from each of clients 101*a*-101*c*. Suffice it to say that desktop input data could be received from any of the registered clients at any time since the same remote desktop will be concurrently displayed on multiple computing devices. For this reason, proxy client 203 can be configured to perform some processing on desktop input data prior to forwarding it onto remote desktop service 202.

In some embodiments, proxy client 203 can be configured to forward desktop input data in the order in which it is received. In other embodiments, proxy client 203 can be configured to selectively block some desktop input data based on various factors such as whether desktop input data is received from more than one remote desktop client 201 (or received locally) at the same time or within some defined threshold, whether multiple sets of desktop input data are conflicting (e.g., keyboard input received at the same time from multiple remote desktop clients), etc. Also, in some embodiments, desktop input data from multiple remote desktop clients 201 could be combined and sent together as a single set of desktop input data to remote desktop service 202. In short, proxy client 203 can perform some type of processing on the desktop input data prior to forwarding it to remote desktop service 202.

One particular type of processing that proxy client 203 can perform on desktop input data is the selective blocking of desktop input data based on whether the source of the desktop input data has been authorized to provide input to the remote desktop. For example, a host of the remote desktop (which may typically be the user of proxy 102 but could equally be a user of any of clients 101*a*-101*c*) may be given the ability to control which users can provide input to the remote desktop at any particular time.

Figure 4:
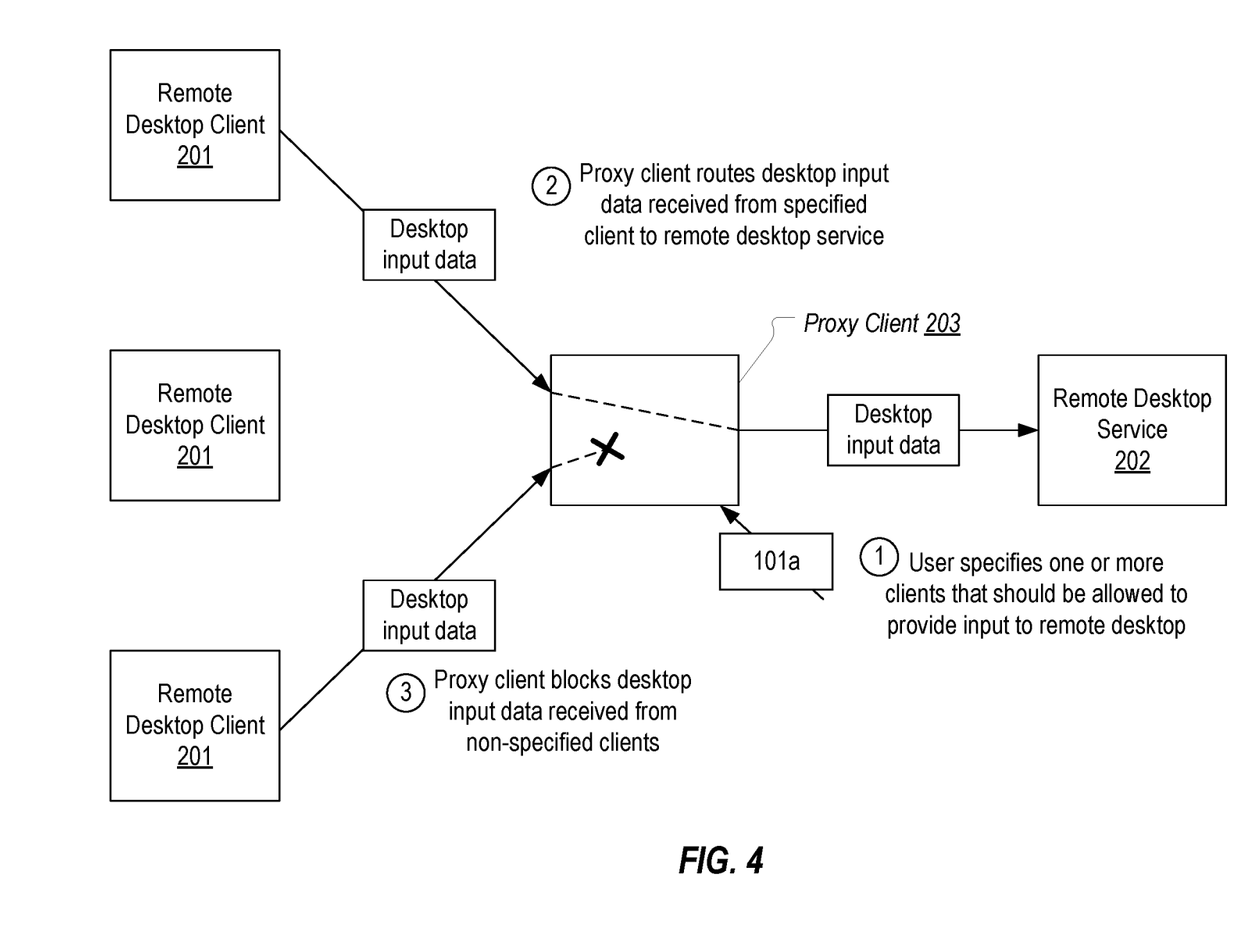
FIG. 4 illustrates an example of how clients can be selectively allowed to provide input to a shared remote desktop.

FIG. 4 illustrates an example of how desktop input data can be selectively blocked. In FIG. 4, it will be assumed that the host of the remote desktop is employing proxy 102 to access the remote desktop and that proxy client 203 is also forwarding the desktop display data to remote desktop clients 201 on clients 101*a*-101*c*.

In step 1, it is assumed that the host provides input that specifies that the user of client 101*a* should be allowed to provide input to the remote desktop. In response to this input, proxy client 203 can commence selectively blocking desktop input data that it receives from any of clients 101*a*-101*c*. For example, it is assumed that desktop input data is received from client 101*a* (which could be determined by the desktop input data including client 101*a*'s identifier in a header, based on the desktop input data being received at a specific port, or in any other suitable manner). Proxy client 203 can determine the source of the desktop input data and, because the source is client 101*a* who was authorized to provide input in step 1, can route the desktop input data to remote desktop service 202 in step 2. In contrast, when desktop input data is received from client 101*c*, proxy client 203 can identify the source of the desktop input data, determine that the source is not currently authorized to provide input to the remote desktop, and block the desktop input in step 3. In this way, desktop input data received from a source that is not currently authorized to provide input to the remote desktop will not be forwarded to remote desktop service 202 and will therefore not be applied to the remote desktop.

Proxy client 203 can provide a user interface by which the host can specify one or more users that are currently authorized to provide input. Similarly, proxy client 203 could provide an option to block any particular user from providing input. Alternatively or additionally, remote desktop client 201 could provide an interface by which a user can request authorization to provide input and/or to pass authorization to another user and/or the host. In such cases, remote desktop client 201 can communicate with proxy client 203 to effectuate this authorization (e.g., by prompting the host to grant authorization when a user requests it). Using these techniques, proxy client 203 can ensure that desktop input data from only a single source will be provided to remote desktop service 202 at any particular time. This can prevent concurrent input from multiple users from causing inconsistent and/or undesirable modifications to the desktop.

Figure 5:
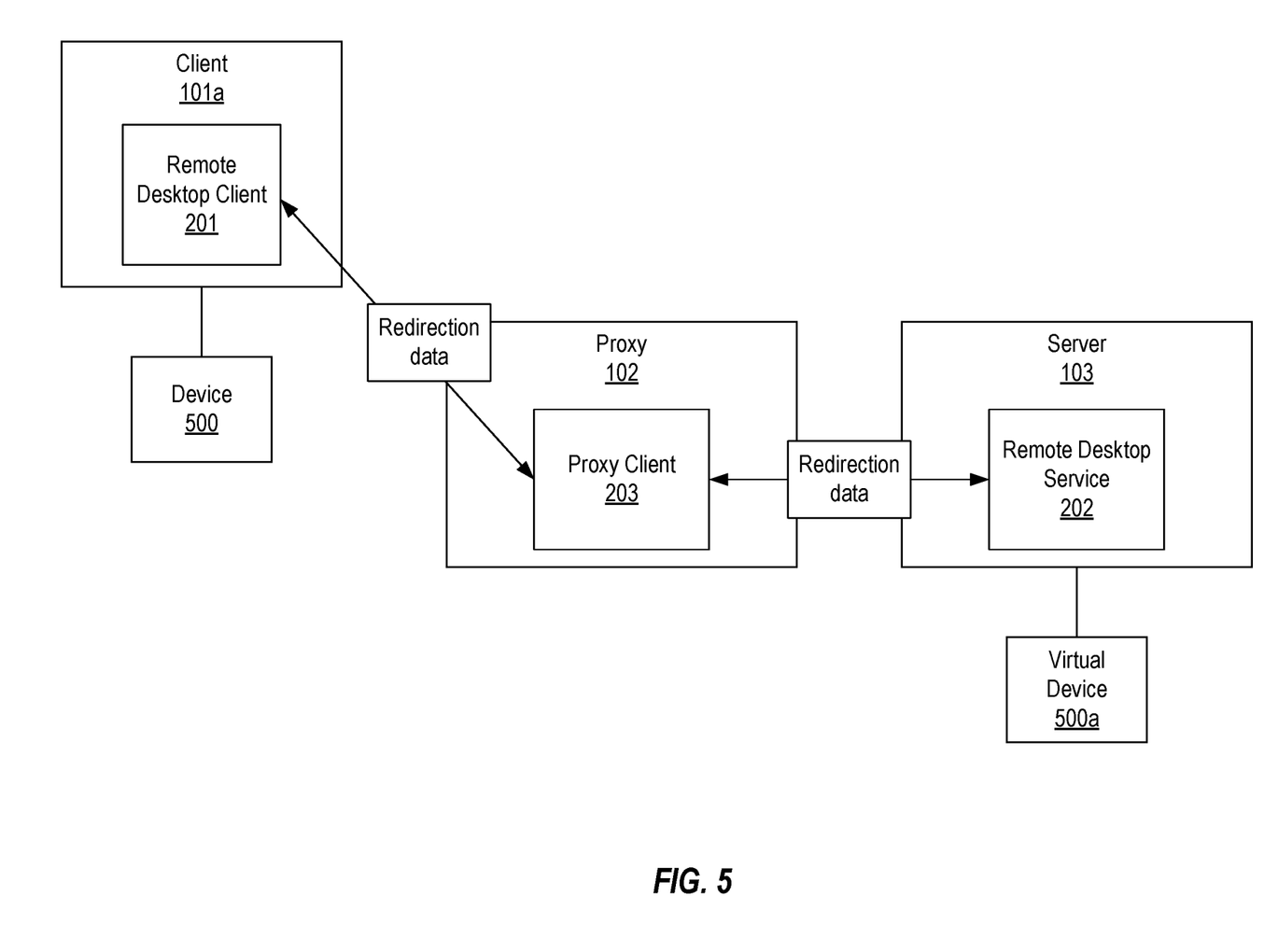
FIG. 5 illustrates an example of how a device can be redirected for access within a shared remote desktop.

In some embodiments, proxy client 203 can also be configured to allow devices connected to clients 101*a*-101*c* and/or proxy 102 to be accessible within the remote desktop. For example, it may be desirable to allow a user to connect a mass storage device to a client to access its contents from the remote desktop. Similarly, it may be desirable to connect a printer or other output device to one of clients 101*a*-101*c* to allow a document to be printed or output from the remote desktop. FIG. 5 illustrates how this type of device redirection can be performed via proxy client 203.

In FIG. 5, it is assumed that a device 500 is connected to client 101*a*. Remote desktop client 201 and remote desktop service 202 can be configured to implement device redirection techniques (e.g., by performing USB device redirection, driver mapping, or another suitable redirection technique) to cause a virtual device 500*a* to appear on server 103. In such cases, proxy client 203 can function as an intermediary for routing "redirection data" between remote desktop client 201 and remote desktop service 202. This redirection data can represent communications that are performed to install virtual device 500*a* on server 103 as well as communications that target the contents or functionality of device 500.

For example, if device 500 is a mass storage device, an application or operating system component executing on the remote desktop may send SCSI commands to access files on device 500. In such a case, remote desktop service 202 can send these SCSI commands via the remote desktop connection (e.g., via a virtual channel) to proxy client 203. Proxy client 203 can then forward these SCSI commands to remote desktop client 201. This forwarding of the SCSI commands can be performed in much the same manner as the desktop display data is forwarded including by multicasting or by a directed channel.

In the context of the present invention, the contents of device 500 (e.g., a file stored on a mass storage device) can be displayed within the remote desktop where it will be visible on each of clients 101*a*-101*c* as well as on proxy 102. Similarly, any functionality of device 500 could also be accessed from any of clients 101*a*-101*c* or proxy 102 by providing appropriate desktop input data. In short, by employing proxy client 203, a single remote desktop can be viewed and accessed from many computing devices as if each computing device "owned" the remote desktop. The present invention can therefore facilitate collaboration or the sharing of information within the confines of a remote display protocol environment.

In summary, a proxy client can be employed on a computing device to allow multiple computing devices to view and interact with the same remote desktop. The proxy client can receive desktop display data and forward it to the multiple computing devices (e.g., by rewriting the IP header of a display data PDU to cause it to be multicast over a LAN). The proxy client can also receive desktop input data from the multiple computing devices and route the desktop input data back to the server (e.g., by rewriting the IP header of keyboard and mouse input PDUs to target the IP address of the server rather than an IP address of the proxy or a multicast IP address).

Figure 6:
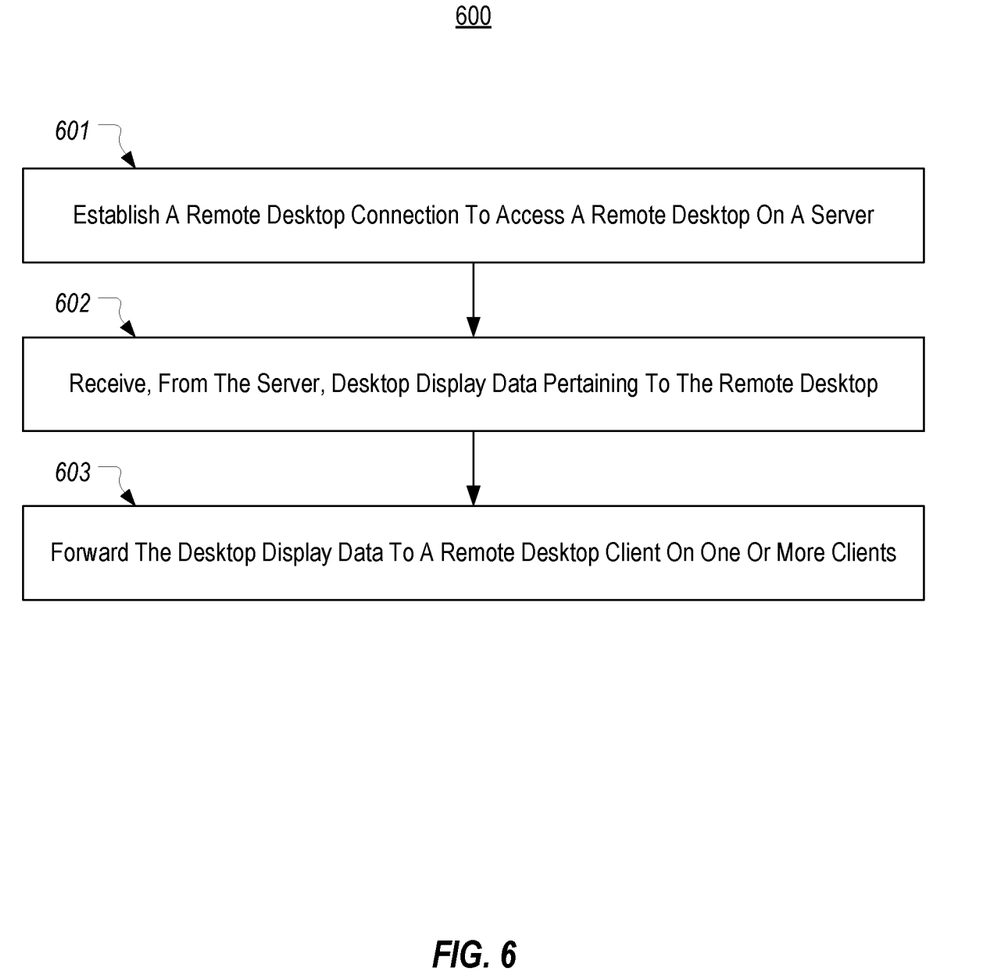
FIG. 6 illustrates a flowchart of an example method for sharing a remote desktop.

FIG. 6 provides a flowchart of an example method 600 for sharing a remote desktop. Method 600 can be implemented by proxy client 203 on proxy 102.

Method 600 includes an act 601 of establishing a remote desktop connection to access a remote desktop on a server. For example, proxy client 203 can interface with remote desktop service 202 on server 103 to establish a remote desktop connection.

Method 600 includes an act 602 of receiving, from the server, desktop display data pertaining to the remote desktop. For example, remote desktop service 202 can periodically send desktop display data to proxy client 203 defining the display of a desktop executed on server 103.

Method 600 includes an act 603 of forwarding the desktop display data to a remote desktop client on one or more clients. For example, proxy client 203 can send the desktop display data to a multicast IP address or can send the desktop display data directly to each of the one or more clients.

In the above description, it has generally been assumed that proxy 102 is the computing device employed by a teacher, administrator, or other user with higher access privileges. However, the present invention can be implemented in embodiments where any of clients 101a-101n can function as a proxy at any given time. For example, all end-user computing devices could include a proxy client that could either perform the functionality of proxy client 203 or of remote desktop client 201. In such a case, any of clients 101a-101n could establish a remote desktop connection with remote desktop service 202 and then commence sharing the remote desktop with any number of the other clients (or with proxy 102).

This type of environment may be particularly useful in an educational setting where a student may access a remote desktop from one of clients 101a-101n and may desire to share the remote desktop with a teacher (e.g., to receive help) or with another student (e.g., to collaborate). In such a case, a proxy client on the student's computing device (e.g., client 101a) can provide an option that the student can select to share his or her remote desktop with one or more other users. Alternatively, a proxy client or remote desktop client on another computing device (e.g., on clients 101b-101n or proxy 102) may allow another student or the teacher to initiate the process of sharing the student's remote desktop. For example, a teacher may be allowed to automatically view any student's remote desktop while a student may be required to submit a request (and possibly receive teacher approval) to view another student's remote desktop.

In short, whether a computing device is considered a proxy or a client may be based entirely on the current role of the computing device. If the computing device is sharing a remote desktop that it established, the computing device can be viewed as a proxy. In contrast, if the computing device is viewing a remote desktop that was established by anther computing device, the computing device can be considered a client. Therefore, any given computing device may be configured to function as either or both a proxy or a client in accordance with the techniques of the present invention. Additionally, it is possible that a single computing device may function as both a client and a proxy at the same time. For example, proxy 102 may share a remote desktop with clients 101a-101n while also displaying a remote desktop that is being shared by client 101a.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a proxy client executing on a proxy, for sharing a remote desktop to enable multiple users to simultaneously view the remote desktop, the method comprising:

establishing, by the proxy client that executes on the proxy, a remote desktop connection to access a remote desktop on a server, the proxy client establishing the remote desktop connection via a remote display protocol;

receiving, by the proxy client and from the server, remote display protocol communications that contain desktop display data pertaining to the remote desktop;

extracting the desktop display data from the remote display protocol communications and then using the desktop display data to cause the remote desktop to be displayed on the proxy; and forwarding the remote display protocol communications that contain the desktop display data to a remote desktop client on each of a plurality of clients to thereby enable the remote desktop client on each of the plurality of clients to extract the desktop display data from the forwarded remote display protocol communications and then use the desktop display data to cause the remote desktop to be displayed on each of the plurality of clients thereby causing the remote desktop to be displayed on the plurality of clients and the proxy simultaneously.

2. The method of claim 1, further comprising:

receiving, by the proxy client and from the remote desktop client on at least one of the plurality of clients, additional remote display protocol communications that contain desktop input data pertaining to the remote desktop; and forwarding the additional remote display protocol communications that contain the desktop input data to the server.

3. The method of claim 2, wherein the additional remote display protocol communications that contain the desktop input data are received at a multicast IP address.

4. The method of claim 1, wherein the remote display protocol communications that contain the desktop display data comprise protocol data units (PDUs), and wherein forwarding the remote display protocol communications that contain the desktop display data comprises forwarding the PDUs.

5. The method of claim 1, further comprising:

in response to user input to the remote desktop displayed on the proxy, generating, by the proxy client, additional remote display protocol communications that contain desktop input data to represent the user input; and sending the additional remote display protocol communications that contain the desktop input data to the server.

6. The method of claim 1, wherein the plurality of clients includes a first client and a second client, the method further comprising:

receiving user input that authorizes a user of the first client to provide input to the remote desktop;

receiving additional remote display protocol communications that contain desktop input data from the remote desktop client on the first client; and forwarding the additional remote display protocol communications that contain the desktop input data to the server.

7. The method of claim 6, further comprising:

receiving other remote display protocol communications that contain desktop input data from the remote desktop client on the second client; and blocking the other remote display protocol communications such that the other remote display protocol communications are not sent to the server.

8. The method of claim 7, wherein receiving the other remote display protocol communications that contain desktop input data from the remote desktop client on the second client comprises identifying that the other remote display protocol communications include an identifier associated with the second client.

9. The method of claim 8, wherein the identifier is included in a header of the other remote display protocol communications.

10. The method of claim 8, wherein the identifier comprises an IP address of the second client.

11. The method of claim 1, wherein the remote display protocol communications that contain the desktop display data are forwarded to a multicast IP address.

12. The method of claim 1, further comprising:

sending redirection data to or receiving redirection data from a remote desktop client on one of the plurality of clients to which a device that is redirected to the remote desktop is connected.

13. One or more computer storage media storing computer executable instructions which when executed on a proxy implement a proxy client that is configured to share a remote desktop to enable multiple users to simultaneously view the remote desktop, the proxy client being configured to perform the following:

receive, via a remote desktop connection established with a server, remote display protocol communications that contain desktop display data pertaining to a remote desktop executing on the server;

extract the desktop display data from the remote display protocol communications and then use the desktop display data to cause the remote desktop to be displayed on the proxy;

send the remote display protocol communications that contain the desktop display data to a remote desktop client executing on a plurality of clients to allow the remote desktop to be simultaneously displayed on each of the plurality of clients;

receive, from at least one of the plurality of clients, additional remote display protocol communications that contain desktop input data defining user input that was received at the remote desktop; and forward the additional remote display protocol communications that contain the desktop input data over the remote desktop connection.

14. The computer storage media of claim 13, wherein sending the remote display protocol communications that contain the desktop display data comprises multicasting the remote display protocol communications that contain the desktop display data.

15. The computer storage media of claim 13, wherein the additional remote display protocol communications that contain the desktop input data are received from a remote desktop client on a first client, the proxy client being further configured to determine that a user of the first client has been authorized to provide input to the remote desktop.

16. The computer storage media of claim 15, wherein determining that a user of the first client has been authorized to provide input to the remote desktop comprises determining that the additional remote display protocol communications include an identifier that is associated with the first client.

17. The computer storage media of claim 16, wherein the identifier is included in a header of the additional remote display protocol communications.

18. The computer storage media of claim 15, wherein the proxy client is further configured to:

receive other remote display protocol communications that contain desktop input data from a remote desktop client on a second client; and block the other remote display protocol communications based on a determination that a user of the second client has not been authorized to provide input to the remote desktop.

19. A method, performed by a proxy client executing on a proxy, for sharing a remote desktop to enable multiple users to simultaneously view the remote desktop, the method comprising:

establishing, by the proxy client that executes on the proxy, a remote desktop connection to access a remote desktop on a server, the proxy client establishing the remote desktop connection via a remote display protocol;

receiving, by the proxy client and from the server, remote display protocol communications that contain desktop display data pertaining to the remote desktop;

forwarding, by the proxy client, the remote display protocol communications that contain the desktop display data to a remote desktop client on each of a plurality of clients to thereby enable the remote desktop to be displayed on each of the plurality of clients simultaneously;

receiving, by the proxy client and the remote desktop client on at least one of the plurality of clients, additional remote display protocol communications that contain desktop input data pertaining to the remote desktop, the desktop input data defining user input that was received at the at least one of the plurality of clients; and     forwarding, by the proxy client, the additional remote display protocol communications that contain the desktop input data to the server.

20. The method of claim 19, wherein the remote display protocol communications that contain the desktop display data are forwarded to the remote desktop client on each of the plurality of clients by forwarding the remote display protocol communications to a multicast IP address.

\* \* \* \* \*